July 3, 1956  R. POHLMAN  2,752,914
BODY ATTACHING MEANS FOR ULTRASONIC APPARATUS
Filed Oct. 25, 1954
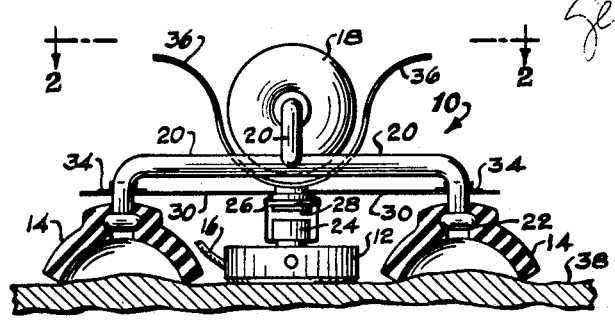
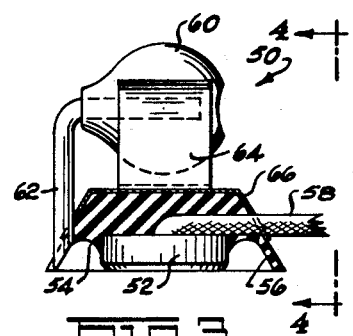
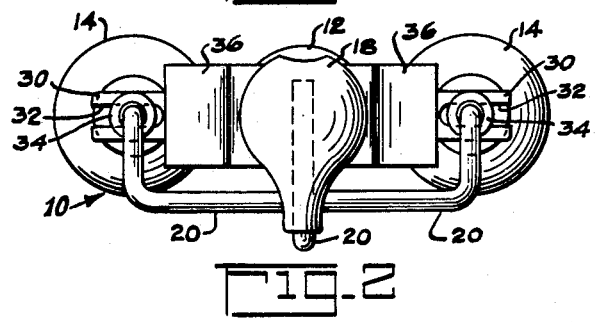
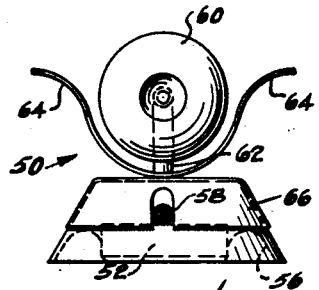
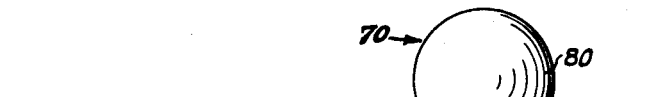
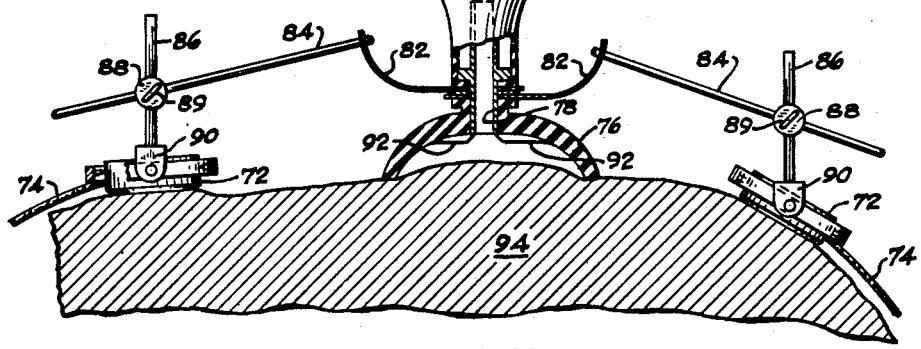
INVENTOR
REIMAR POHLMAN
BY
AGENT

United States Patent Office 2,752,914
Patented July 3, 1956

2,752,914
BODY ATTACHING MEANS FOR ULTRASONIC APPARATUS

Reimar Pohlman, Zurich, Switzerland, assignor to USAG Ultraschall A. G., Zurich, Switzerland, a Swiss corporation Application October 25, 1954, Serial No. 464,445

5 Claims. (Cl. 128—24)

This invention relates to ultrasonic apparatus and is particularly directed to such apparatus including means for holding the apparatus in contact with the body to be subjected to ultrasonic energy.

Heretofore, when ultrasonic energy was used for medical treatment, the radiating surface of the ultrasonic energy transmitter was pressed by hand in contact with the body under treatment or the transmitter was moved along the body in a massaging motion. Both methods of treatment require the hand of the operator to be steadied by resting it on or against the body of the patient and therefore the treatment was very tiring and time consuming on the part of the operator.

Likewise when ultrasonic energy was used for inspection of materials the transmitter had to be held and moved by hand so that either the hand had to be steadied or relatively complicated holding devices had to be provided.

An object of the present invention comprises the provision of novel ultrasonic apparatus in which the aforementioned difficulties are eliminated. A further object of the invention comprises the provision of such ultrasonic apparatus including a suction-type means for holding the radiating surface of the transmitter in firm contact with the body to be subjected to ultrasonic energy. In the case of medical treatment only an ultrasonic transmitter is used while for material inspection both an ultrasonic transmitter and an ultrasonic receiver may be used and the invention is applicable to the receiver as well as to the transmitter.

An ultrasonic transmitter generally comprises a device which receives electric energy and by means of a quartz crystal transforms this energy into mechanical vibrations or sound waves of ultrasonic frequency, these waves being transmitted thereby into the body to be treated or inspected. An ultrasonic receiver comprises a similar device but in this case the device receives the ultrasonic vibrations and transforms these vibrations into electric energy. Hence both the ultrasonic transmitter and receiver may be termed an ultrasonic transducer and although the invention is hereinafter described in connection with ultrasonic transmitters it will be apparent that the invention is also useful in connection with ultrasonic receivers.

Other objects of the invention will become apparent upon reading the annexed detailed description in connection with the drawing in which:

Fig. 1 is a sectional view through ultrasonic apparatus embodying the invention;

Fig. 2 is a top view of the apparatus of Fig. 1;

Fig. 3 is a view similar to Fig. 1 but illustrating a modified form of the invention;

Fig. 4 is an end view of the apparatus of Fig. 3; and

Fig. 5 is a sectional view of another modified form of the invention.

Referring first to Figs. 1 and 2 of the drawing, there is illustrated ultrasonic apparatus 10 comprising an ultrasonic transmitter 12 connected to a pair of suction cup members 14 preferably of rubber-like material and having an electric cable connection 16. A hollow bulb 18, of rubber-like material has one end of a rigid conduit 20 extending therein. The other end of said conduit 20 is branched with the end of each branch connected to one of the cup members 14 so that the bottom of each cup member 14 is in communication with the interior of the bulb 18. The connection between each branch of conduit 20 and a cup member 14 includes a flange 22 on the conduit, said flange being received within a recess in the cup member and having a spherical outer surface so that each cup member easily adjusts angularly to the contour of the body as said cup members are being attached to said body.

As illustrated, the transmitter 12 has a flat construction in that its diameter is substantially larger than its thickness or height. The transmitter is rotatably attached to a centrally located pivot pin 24 which in turn is fastened to a clamp 26. The clamp 26 has resilient fingers which are snapped over an annular flange on a stud 28 to provide a flexible connection therebetween. A leaf spring 30 is connected at its midportion to the stud 28 and each end of the spring 30 is forked, as indicated at 32, to straddle the adjacent conduit 20 and to bear against a flange 34 connected to said conduit. In addition a plate or member 36 having a pair of oppositely extending wing-like portions is connected to the stud 28 intermediate its ends.

With the aforedescribed construction, when the apparatus 10 is to be applied to a body 38, which may be a portion of a human body for subjecting said body to ultrasonic sound waves, the wing plate 36 is first grasped by hand for example by the index and middle finger and at the same time the bulb 18 is compressed for example by the thumb. This pushes the rigid conduit 20 and the suction cups 14 forward relative to the transmitter 12 so that the suction cups can easily be pressed against said body. Then upon release of the apparatus, the bulb 18 will expand to provide a low pressure in each suction cup to hold the apparatus 10 on the body and at the same time the spring 30 will gently press the radiating surface of the transmitter 12 against said body. The flexible support for the transmitter 12 permits the transmitter to automatically adjust itself to lie flat against the surface of said body 38.

Referring now to Figs. 3 and 4, there is illustrated a modified ultrasonic apparatus 50 in which an ultrasonic transmitter 52 similar to the transmitter 12 is secured to the center of a suction cup member 54 of rubber-like material so as to form an annular channel 56 between the wall of the suction cup and the transmitter 52. An electric cable connection 58 to the transmitter 52 extends through a wall of the suction cup. A hollow rubber-like bulb 60 is connected to the suction cup 54 by a conduit 62 so as to provide communication between the channel 54 of said suction cup and the interior of said bulb. A plate 64, having a pair of oppositely extending wing-like portions, is secured intermediate its ends to a metal cap 66 surrounding the bottom wall (upper portion as viewed in Figs. 3 and 4) of the suction cup and to which the rubber material of the suction cup is bonded.

The apparatus 50 of Figs. 3 and 4 is applied and secured to a body to be exposed to ultrasonic vibrations in substantially the same manner as the apparatus 10 of Figs. 1 and 2. In the case of the apparatus 50 the bottom wall of the suction cup functions as the spring to gently urge the transmitter 52 into contact with the body.

The apparatus 50 of Figs. 3 and 4 is more compact than the apparatus 10 of Figs. 1 and 2 but in the case of the apparatus 10 it is possible to more readily change the ultrasonic transmitter as for example may become necessary when a different frequency of ultrasonic vibration is desired for a specific application or treatment.

Fig. 5 illustrates a further modification in which a plurality of ultrasonic transmitters are adjustably connected to a single suction cup device. Thus in Fig. 5 ultrasonic apparatus 70 comprises a plurality of ultrasonic transmitters 72 each similar to the transmitter 12 and having an electric cable 74 connected thereto. A suction cup 76 is connected by a conduit 78 to a hollow rubber-like bulb 80. A plurality of elastic or leaf spring members 82 are provided each having one end swingably connected to the conduit 78 for rotational adjustment, under slight friction, about the axis of said conduit. The other end of each spring member 82 is connected to one of a plurality of arms 84. Each arm 84 is also adjustably connected to a second arm 86 by a joint 88 permitting angular adjustment of the arms relative to each other and adjustment of the connection of each arm along the other. Each joint includes a single clamping screw 89 for locking the joint in any position of angular or longitudinal adjustment along the arms 84 and 86. One end of each arm 86 is connected to one of the ultrasonic transmitters 72 by a suitable universal connection which has been illustrated as a gimbal-type connection 90. With the transmitters 72 supported by the universal connections 90, each transmitter automatically adjusts itself to the contour of a body on contact therewith.

The suction cup 76 is also provided with means 92 projecting from its bottom wall which may comprise ribs projecting from said wall or a wire insert disposed along this wall so as to project as ribs therefrom. The means 92 prevent airtight contact between the surface of a body 94 to which the cup 76 is applied and the bottom of the cup and in the case of a human body prevent the skin of the patient from being drawn up into the conduit 78 which would decrease the available suction force. Means similar to means 92 may also be incorporated in the suction cups 14 and 54 of Figs. 1–4.

The ultrasonic apparatus 70 is applied to a body in much the same manner as the apparatus 10 and 50. In the case of the apparatus 70 after the suction cup 76 has been secured to a body 94, each arm 84 is rotatably adjusted about the axis of the conduit, each joint 88 is adjusted along the arm 84 and each arm 86 is adjusted along its joint 88 to bring the radiating surface of its associated transmitter 72 into contact with the desired portion of the body 94. The leaf springs 82 function to maintain each transmitter in firm contact with the body 94.

Fig. 5 illustrates but two transmitters 72. Obviously however additional transmitters may be supported from the conduit 78 of the suction cup 76. In general three or more transmitters may be required for effective treatment. If all of the transmitters are to be disposed on one side of the suction cup 76 it may become desirable to replace one of the transmitters by a second suction cup to provide additional support.

The ultrasonic apparatus of Figs. 1–5 provides for safe and reproducible ultrasonic treatment of human beings even if the patient moves a great deal while under treatment. In the case of treatment of human beings by ultrasonic sound waves it usually is necessary to apply a coupling substance to the skin to eliminate any layer of air between the radiating surface of the transmitter and the skin of the patient because any such air layer reduces the efficiency of transmission of the sound waves into the patient. Water soluble gelatine or jelly-like pastes have proved to be very effective as such a coupling substance even when the ultrasonic transmitter is applied to hairy parts of the body. Such a coupling substance also helps to provide a tight connection between the suction devices and the body.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. Ultrasonic apparatus comprising a suction cup member; a plurality of ultrasonic energy devices; and a plurality of means, one for each of said devices; each of said means connecting its associated device to said suction cup member and including a spring member for resiliently urging its associated device into contact with a body upon securement of said suction cup member thereto.

2. Apparatus as recited in claim 1 in which each of said connecting means includes said spring member and means permitting angular adjustment of said device relative to said suction cup member.

3. Apparatus as recited in claim 2 and including a hollow bulb of rubber-like material and passage means connecting the interior of said bulb to the interior of said cup member.

4. Apparatus as recited in claim 1 in which each of said connecting means includes a universal-type connection with its associated device permitting angular adjustment of said device in all directions relative to said suction cup member.

5. Ultrasonic apparatus comprising a suction cup member; a plurality of ultrasonic energy devices; and a plurality of means one for each of said devices; each of said means having a connection at one end to said suction cup member providing for rotative adjustment about said member and having a connection with one of said devices at its other end providing for angular adjustment of said device, each of said means also including means permitting adjustment of its associated device toward and away from said suction cup member and including a spring member for resiliently urging its associated device into contact with a body upon securement of said suction cup member to said body.

References Cited in the file of this patent

UNITED STATES PATENTS

| | | |
|---|---|---|
| 670,391 | Robinson | Mar. 19, 1901 |
| 1,094,409 | Green et al. | Apr. 21, 1914 |
| 2,047,658 | Zaiger | July 14, 1936 |
| 2,580,628 | Welsh | Jan. 1, 1952 |
| 2,660,175 | Thrasher et al. | Nov. 24, 1953 |

FOREIGN PATENTS

| | | |
|---|---|---|
| 654,673 | Germany | Dec. 24, 1937 |